INVENTOR
HARRY E. ZANKEY

United States Patent Office 3,359,706
Patented Dec. 26, 1967

3,359,706
ADSORPTION GAS TREATING METHOD
AND APPARATUS
Harry E. Zankey, Pittsburgh, Pa., assignor to McGraw-Edison Company, Milwaukee, Wis., a corporation of Delaware
Filed May 28, 1964, Ser. No. 370,831
5 Claims. (Cl. 55—20)

ABSTRACT OF THE DISCLOSURE

A two chamber adsorption system wherein gas to be dried passes through the reactivating heater, the adsorption chamber being regenerated, through an intercooler-condenser, and the adsorption chamber in service with the heater deactivated after a predetermined flow and reversing system flow relative to the chambers when the temperature in the chamber being regenerated falls below a predetermined value.

---

Figure 1:
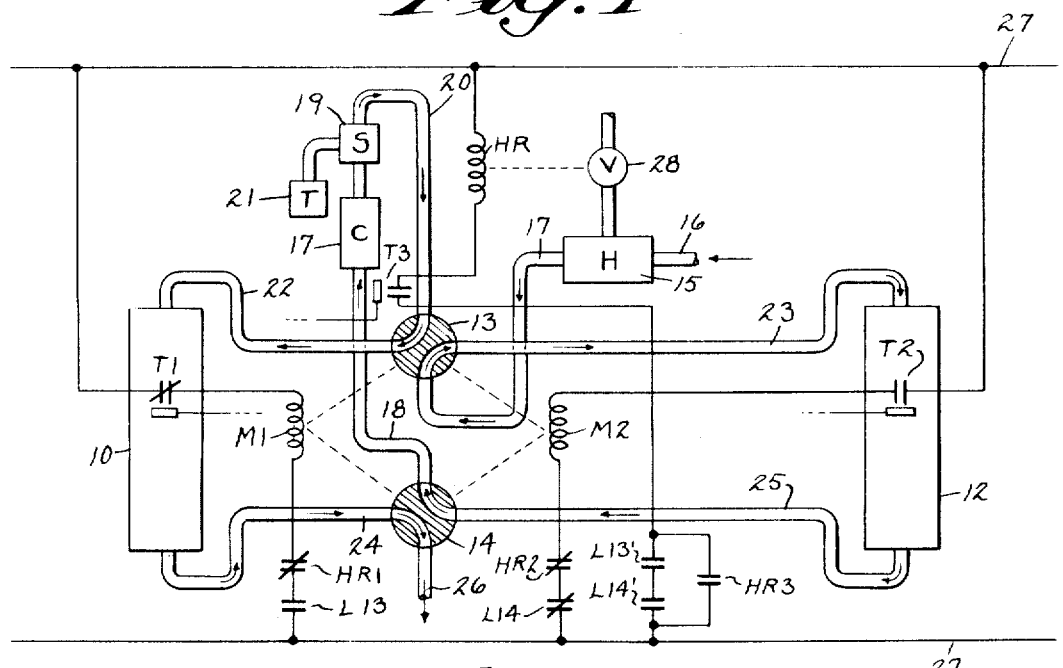

This invention relates to gas treating method and apparatus and, more particularly, to a method and an apparatus for removing moisture from an air stream.

Apparatus for the drying or purifying of gas by the general method of contacting it with an adsorptive material or desiccant, such as activated alumina, is well known. In systems of this type, the gas to be treated is passed for a period of time through an adsorber unit until the adsorptive material therein becomes contaminated with moisture or other impurities to the point where the safe limit of its adsorptive capacity is reached. At this point the flow of gas to be treated is stopped, and the unit is then reactivated. This is accomplished by circulating heated, moisture-free reactivating gas, such as air, through the adsorptive material, so that the adsorbed impurities and moisture are evaporated and carried away. The moisture-laden reactivating gas is then cooled and passed through a moisture-eliminating apparatus. If continuous operation is desired, a pair of adsorption chambers may be utilized, one of which is in use while the other is being reactivated.

In one type of prior art continuous adsorptive gas drying system having a pair of adsorption chambers, a portion of the gas is bled from the main system for use in reactivating one of the chambers. Such prior art systems generally include timing apparatus wherein one adsorption chamber is employed for drying and the other is reactivated for a predetermined length of time, whereupon the chambers are switched so that the one chamber is reactivated while the other is employed for drying the gas stream. Such prior art systems were unsatisfactory in situations where the total stream to be dried is insufficient to meet reactivating requirements on a fixed time cycle. Thus, in systems where the quantity of gas flow fluctuates widely and wherein a portion of the gas stream is used for reactivation, there may be insufficient gas flow to accomplish reactivation during any given fixed time period.

It is an object of the invention to provide a gas drying system wherein the gas being treated is employed for the reactivating cycle wherein there is no gas loss or need for additional gas supply.

Another object of the invention is to provide a gas drying system wherein the duration of the reactivating cycle is dependent upon the quantity of air being treated.

Still another object of the invention is to provide a continuous gas drying system, having first and second adsorption chambers, a reactivating system coupled to the input of the gas drying system, flow control means having one position for coupling the first adsorption chamber in the reactivating system and the second adsorption chamber between the reactivating system and the output of the gas drying system so that the first adsorption chamber is being reactivated and the second adsorption chamber is drying the system gas, the flow control means having an alternate position for reversing the couplings of the adsorption chambers so that the drying and reactivation operations of the chambers are reversed, and flow responsive means in the gas drying system for shifting the flow control means to a different position after a predetermined quantity of gas has flowed through the adsorption chamber being reactivated.

A more specific object of the invention is to provide such a continuous gas drying system wherein the reactivating system includes heating means coupled to the input of the gas drying system and cooling means for being coupled between the adsorption chambers. A still more specific object of the invention is to provide such a system wherein the first flow responsive means is thermoresponsive and is operative to deactivate the heating means when the temperature at the output of the chamber being reactivated rises above a predetermined value and wherein the second flow responsive means is thermoresponsive and is operable to effect the shifting of the flow control means when the temperature within the chamber being reactivated falls below a predetermined value.

A still further object of the instant invention is to provide a method for the continuous drying of a stream of gas in a system with apparatus having a pair of adsorption chambers, the steps of heating the gas streams and conducting it through one of the chambers, cooling and removing the condensate from the gas flowing from the one chamber and conducting the gas through the other chamber and returning it to the system, discontinuing the heating of the gas after a first quantity thereof flows through the one chamber and reversing the flow of system gas relative to the chambers and reinitiating the heating of the gas stream after a second quantity of gas flows through the one chamber so that said heated gas flows through said other chamber and the gas flowing from the other chamber is cooled and conducted through the one chamber before return to the system. A still more specific object of the invention is to provide such a method wherein the heating of the gas is discontinued when the temperature of the gas flowing from the one chamber exceeds a predetermined value so that the unheated gas streams begins cooling the one chamber, and wherein the flow of system gas is reversed relative to said chambers and the heating of the gas stream is reinitiated when the temperature in the one chamber falls below a predetermined level.

Figure 2:
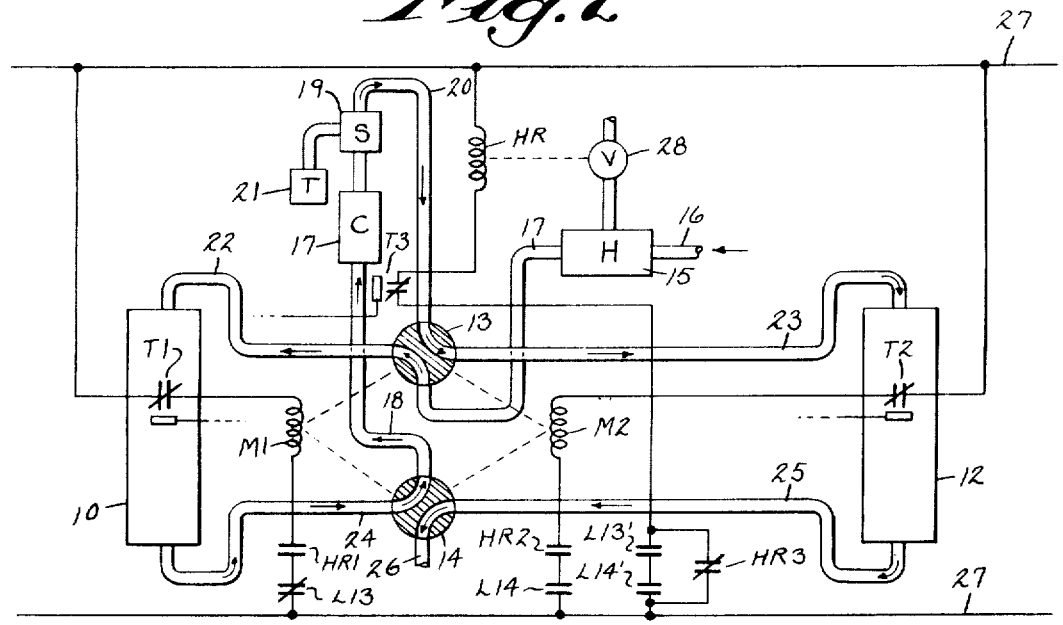

These and other objects and advantages of the instant invention will become more apparent from the detailed description thereof taken with the accompanying drawings wherein:

FIG. 1 schematically illustrates a gas drying system according to the instant invention; and FIG. 2 shows the gas drying system of FIG. 1 in an alternate position.

Referring now to the drawing in greater detail, a gas drying system of the dual adsorption chamber type is shown in the drawings to include a first adsorption chamber 10 and a second adsorption chamber 12 each containing a material having a high affinity for water molecules such as activated alumina. In dual adsorption systems, it is possible to reactivate one of the adsorption chambers while the other is being used, thereby allowing continuous operation. For this purpose, the system includes a first reversible four-way valve 13 and a second reversible four-way valve 14 for controlling which one of the adsorption chambers 10 or 12 is in drying service and which is being reactivated. When the valves 13 and 14 are in their position shown in FIG. 1, the adsorption chamber 10 is performing the drying operation and the adsorption chamber 12 is being reactivated. On the other hand, when the valves 13 and 14 are in their positions shown in FIG. 2, chamber 10 is being reactivated and chamber 12 is in drying service. As will be pointed out more fully hereinbelow, each of the valves 13 and 14 is reversed when the reactivation is complete in the chamber being reactivated.

The system also includes a heating chamber 15 having its input connected by conduit 16 to the source of gas to be dried and its output connected by a conduit 17 to valve 13. In addition, the system includes a cooler-condenser 17 whose input is connected by a conduit 18 to the valve 14 and whose output is connected to a moisture separator 19 which in turn is connected by a conduit 20 to the valve 13. In addition, the moisture separator 19 is connected to a condensate trap 21 so that the moisture removed from the system by the cooler-condenser 17 and the moisture separator 19 may be removed.

As those skilled in the art will appreciate, reactivation is accomplished by heating the incoming gas in heater 15 and passing it through the adsorption chamber being reactivated. The heated gas removes adsorbed moisture and other impurities held by the adsorbing material. The moisture laden gas is then passed through the cooler 17 where the moisture is condensed into droplets which are removed from the gas stream by the separator 19.

Conduits 22 and 23 connect the valve 13 to the upper ends of the adsorption chambers 10 and 12, respectively, while conduits 24 and 25 connect valve 14 to the lower ends, respectively, of said chambers. Conduit 26 also connects valve 14 to the system being supplied with dried gas.

The reversible four-way valves 13 and 14 are each controlled by solenoids schematically represented by coils M1 and M2. Coil M1 is operative, when energized, to place the valves 13 and 14 in their positions shown in FIG. 1 wherein adsorber 10 is in drying service and adsorber 12 is being reactivated. Solenoid M2 is operative when energized to shift each of the valves 13 and 14 to their alternate positions shown in FIG. 2, wherein adsorber 12 is in drying service and adsorber 10 is being reactivated.

Solenoid coil M1 is controlled by the temperature within the adsorber 10 and, for this purpose, it is connected in series with the contacts of a thermostat T1 disposed in adsorber 10 and the combination connected across a power source 27. Similarly, the solenoid coil M2 is controlled by the temperature within the adsorber 12 and, for this purpose, it is connected in series with the contacts of a second thermostat T2 disposed within the adsorber 12, and the series combination connected across the power source 27. Thermostats T1 and T2 are constructed and arranged to open their respective contacts when the temperature of their environment falls to a predetermined level and this may be slightly in excess of the normal operating temperature of the adsorbent bed during the drying cycle, which for one type of well known adsorber is 150° F.

A third thermostat T3 is disposed in conduit 18 between valve 14 and cooler-condenser 17 and its contacts are in series with the coil of a heater relay HR and the combination is connected across the source 27. Relay HR controls a valve 28 which connects the heater 15 to a source of steam so that when relay HR is energized heater 15 will heat the system gas flowing through the conduit 16. In order to prevent the valve solenoids M1 and M2 from performing a valve shift while the heater is in operation, contacts HR1 and HR2 are placed in series with the relay coils M1 and M2, respectively, and each of said contacts is open when said relay is energized and closed when heater relay HR is deenergized.

Limit switch contacts L13 coupled to valve 13 and L14 coupled to valve 14 are respectively connected in series with relay coils M1 and M2. Limit switch contacts L13 are open when the valve 14 is in its position shown in FIG. 1 and closed when valve 13 is in its position shown in FIG. 2. Similarly, limit switch contacts L14 are closed when valve 14 is in its position shown in FIG. 1 and open when valve 13 is in its position shown in FIG. 2. In addition, limit switch contacts L13' and L14' coupled to the valves 13 and 14, respectively, are connected in series with the heater relay HR and each will close momentarily during a valve shift so that the heater relay HR will be energized during the valve shifting operation. Also, holding contacts HR3 are connected in shunt with limit switch contacts L13 and L14 and these contacts close when the heater relay HR is energized, so that the heater relay will remain energized after the limit switch contacts L13' and L14' open upon the completion of the valve shift operation.

In general terms, reactivation is carried out by the system gas which is heated by the heater 15 and then passed to the adsorber being reactivated. Due to the heat of vaporization, the temperature of the gas evolving from this adsorber remains below a predetermined value, e.g., 350° F., until the desired quantity of moisture has been removed therefrom. The temperature of this gas is sensed by T3 which turns off the heater 15 when this predetermined value is reached so that the adsorber begins cooling as a result of the flow of unheated gas. When the adsorber has cooled to a point slightly in excess of its operating temperature, reactivation is complete and the thermostat T1 or T2 initiates a valve shift so that the reactivated adsorber returns to drying service and reactivation of the other adsorber begins.

More specifically, FIG. 1 shows the system with the adsorber in drying service, while adsorber 12 has been reactivated and is in the process of cooling. When the thermostat in adsorber 12 cools to its set point, the contacts of thermostat T2 close to energize coil M2 which causes each of the four-way valves 13 and 14 to shift from their positions shown in FIG. 1 to their positions shown in FIG. 2. This places adsorber 12 in drying service and the reactivation of adsorber 10 begins. During the shifting of valves 13 and 14 from their positions shown in FIG. 1 to their positions shown in FIG. 2, limit switch contacts L13' and L14' will close momentarily to energize heating relay coil HR, which in turn opens valve 28 to connect heater 15 to a source of heat so that the incoming gas in conduit 16 will be heated. The energization of heater relay coil HR, in addition, closes contacts HR3 in shunt with contacts L13' and L14, and opens contacts HR1 and HR2 so that coil M2 is de-energized. Upon the completion of the shifting of valves 13 and 14, contacts L13 close and contacts L14 open while contacts L13' and L14' reopen. The system will then be in its condition shown in FIG. 2 with adsorber 12 in drying service and adsorber 10 being reactivated.

The gas stream from the system flowing through conduit 16 is heated in the heater 15 and then passes through conduit 17, valve 13 and conduit 22 through adsorber 10 where it removes the adsorbed moisture to reactivate the desiccant in adsorber 10. Moisture-laden gas then emerges from adsorber 10 through conduit 24, valve 14, conduit 18 and through cooler condenser 17 where the moisture is condensed and removed from the gas in separator 19 where it may be tapped off in the condensate trap 21. The gas then flows through conduit 20, valve 13 and conduit 23 to adsorber 12, where the remaining moisture is removed down to the requirements of the system and the gas is then returned to the system through conduit 25, valve 14 and conduit 26.

The flow of heated gas into adsorber 10 will cause the temperature therein to rise, so that the contacts of thermostat T1 will open after a short time. After reactivation of adsorber 10 is substantially complete, the temperature of the gas discharging from adsorber 10 through conduits 24 and 18 rises until the operating temperature of thermostat T3, 350° F. for example, is reached. Upon this event the contacts of T3 open to de-energize heating relay HR, which, in turn, closes valve 28 so that the flow of heating steam to heater 15 ceases. In addition, contacts HR1 and HR2 close while HR3 opens.

The continuing flow of gas, now unheated, will cool adsorber 10 until the set point of thermostat T1 is reached, whereupon its contacts are closed to energize valve M1 which shift valves 13 and 14 from their positions shown in FIG. 2 to their positions shown in FIG. 1, whereupon adsorber 10 returns to drying service and reactivation of adsorber 12 begins.

It will be appreciated, from the foregoing, that valves 13 and 14 will not shift until reactivation has been complete, regardless of the instantaneous rate of gas flow in the system. This is because the temperature both at the input of the cooler-condenser 17 and in the adsorber being reactivated, is dependent upon the total gas flow through the adsorber and not upon the rate of gas flow at any particular instant. Thus, complete reactivation may occur regardless of periodic fluctuations in gas flow.

In addition, the reactivation period will vary with the total quantity of gas flow. Thus, during periods of minimum gas flow, it will take a relatively longer time for the adsorber being reactivated to heat to the set point temperature of thermostat T3 and, similarly, after heating relay HR has been de-energized it will take a correspondingly longer time for the adsorber to cool down to the operating temperature of its respective thermostat T1 or T2. Conversely, during period of high gas flow, this reactivation process will take a correspondingly shorter time. Thus, not only does the system insure that complete reactivation will occur during periods of low gas flow but it also provides a shorter cycle during periods of high gas flow.

Another advantage of the gas drying system according to the instant invention is that during periods of relatively high gas flow, the adsorber is in drying service for a relatively shorter time, so that more gas may be treated for any specific quantity of adsorbent material. On the other hand, when the incoming flow rate of gas is reduced, the reactivation rate is diminished, but the rate of bed loading in the adsorber on drying service is also diminished proportionately.

It can be seen, therefore, that the method and apparatus according to the instant invention insure proper reactivation and proper cooling of the bed at substantially any flow rate for the gas being treated and for substantially any degree or pattern of fluctuation of the gas flow. Accordingly, a smaller and less expensive dryer may be employed for any given gas treating requirement, since there is no time waste due to overheating or overcooling. In addition, the system allows a simpler conduit system than one wherein the incoming gas is split to perform reactivation or where a separate gas system is employed for reactivation.

While only a single embodiment of the instant invention has been disclosed, it is not intended to be limited thereby but only by the scope of the appended claims.

I claim:

1. In a continuous gas drying system, having first and second adsorption chambers, heater means coupled to the input of said system, cooler-condenser means, valve means having one position for respectively coupling the input and output of said first adsorption chamber to said heater means and to said cooler-condenser means and for respectively coupling the input and output of said second adsorption chamber to said cooler-condenser means and the output of said system, so that said first chamber is being reactivated and said second chamber is drying the system gas, said valve means having an alternate position for reversing the couplings of said adsorption chambers so that the drying and reactivation operations of said chambers are shifted, heater control means, first thermoresponsive means coupled to said heater control means and the input of the cooler-condenser means and being operable to deactivate said heater control means when the temperature at the input of said cooler-condenser means reaches a predetermined value, second thermoresponsive means in said first adsorption chamber and operatively connected to the valve means for shifting said valve means to their alternate positions when the temperature within said first adsorption chamber falls below a predetermined value and third thermoresponsive means disposed within said second adsorption chamber and operatively connected to the valve means for shifting said valve means to their one position when the temperature within said second adsorption chamber falls below a predetermined value, said heater control means being operable to prevent the shifting of said valve means when said heater is in operation, and means for actuating said heater control means upon the shifting of said valve means.

2. In a continuous gas drying system, having first and second adsorption chambers, heater means coupled to the input of said system, cooler-condenser means, first valve means having one position for coupling the input of said first adsorption chamber to said heater means and the input of said second adsorption chamber to the output of said cooler-condenser means and an alternate position for reversing said couplings, second valve means having one position for coupling the output of said first adsorption chamber to the input of said cooler-condenser means and the output of the second adsorption chamber to the output of said system and an alternative position for reversing said couplings, whereby said first adsorption chamber is being reactivated and said second adsorption chamber is on drying service when said valve means are in their one positions, heater control means, first thermostat means coupled to said heater control means and the input of the cooler-condenser means and being operable to deactivate said heater control means when the temperature at the end of said cooler-condenser reaches a predetermined value, second thermostat means in said first adsorption chamber and operatively connected to the valve means for shifting said valve means to their alternate positions when the temperature within said first adsorption chamber falls below a predetermined value, and third thermostat means disposed within said second adsorption chamber and operatively connected to the valve means for shifting said valve means to their one position when the temperature within said second adsorption chamber falls below a predetermined value, said heater control means being operable to prevent the shifting of said valve means when said heater is in operation, and means for actuating said heater control means upon the shifting of said valve means.

3. In a continuous gas drying system, having first and second adsorption chambers, heater means coupled to the input of said system, cooler-condenser means, first valve means having one position for coupling the input of said first adsorption chamber to said heater means and the input of said second adsorption chamber to the output of said cooler-condenser means and an alternate position for reversing said couplings, second valve means having one position for coupling the output of said first adsorption chamber to the input of said cooler-condenser means and the output of the second adsorption chamber to the output of said system and an alternate position for reversing said couplings, whereby said first adsorption chamber is being reactivated and said second adsorption chamber is on drying service when said valve means are in their one positions, electroresponsive heater control means, first thermostat means coupled to said heater control means and the input of the cooler-condenser means and being operable to open circuit said heater control means when the temperature at the input of said cooler-condenser reaches a predetermined value, first valve control means for moving each of said valve means to their alternate positions, second thermostat means in said first adsorption chamber and operatively connected to the first valve control means for actuating within said first adsorption chamber falls below a predetermined value, second valve control means for moving each of said valve means to their one position, third thermostat means disposed within said second adsorption chamber and operatively connected to the first valve control means for actuating said first valve control means when the temperature within said second adsorption chamber falls below a predetermined value, said heater control means being operable to prevent the shifting of said valve means when said heater is in operation, means for actuating said heater control means upon the shifting of said valve means, and means for preventing the actuation of first valve control means when said valve means are in their another position and for preventing the actuation of said second valve control means when said valve means are in their one position.

4. In a method of drying gas continuously in a gas drying system having two adsorption chambers, a heater, a cooler, and flow control means for selectively directing the gas from input to output in series flow through the heater, one of the chambers which is then being reactivated, the cooler, and the other chamber which is then drying the gas and specifically for reversing the relative positions of the two chambers, comprising the steps of locating a first thermostat at the inlet of the cooler and a second thermostat within each respective chamber; sensing with the first thermostat the gas temperature entering the cooler and, responsive to said temperature rising to a predetermined valve corresponding to the situation where the one chamber then connected between the heater and cooler has been totally reactivated, of discontinuing the operation of the heater; and sensing with the one second thermostat within the chamber being reactivated the temperature of said one chamber and, responsive to said temperature dropping to a predetermined value corresponding to a temperature safe to commence drying of gas within said chamber, of shifting the flow control means to reverse the relative positions in the series flow of the two absorption chambers and correspondingly reverse their functions and likewise initiating the operation of the heater again to repeat the cycle.

5. Method of automatically reactivating a gas drying system for allowing continuous gas drying, the system having first and second adsorption chambers, a heater, a cooler, and flow control means for selectively directing the gas from input in series either through the heater, the first chamber, the cooler, and the second chamber to output, or alternatively from input in series through the heater, the second chamber, the cooler and the first chamber to output, the steps sequentially and repeatedly comprising sensing the gas temperature between the first chamber and the cooler and, automatically responsive to said temperature raising to a predetermined value, discontinuing the operation of the heater; sensing the temperature in the first chamber and, automatically responsive to said temperature dropping to a predetermined value, shifting the flow control means to the alternate series flow and initiating the operation of the heater; sensing the gas temperature between the second chamber and the cooler and, automatically responsive to said temperature rising to a predetermined value, discontinuing the operation of the heater; and sensing the temperature in the second chamber and, automatically responsive to said temperature dropping to a predetermined value, shifting the flow control means to the original series flow and further initiating the operation of the heater again.

References Cited
UNITED STATES PATENTS

| | | | |
|---|---|---|---|
| 2,561,441 | 7/1951 | Lou | 55—163 |
| 2,629,460 | 2/1953 | Maki | 55—62 X |
| 2,675,089 | 4/1954 | Kahle | 55—62 |
| 3,124,438 | 3/1964 | Lavery | 55—62 X |
| 3,241,294 | 3/1966 | Walker et al. | 55—62 X |
| 3,243,938 | 4/1966 | Lavery et al. | 55—62 X |

REUBEN FRIEDMAN, *Primary Examiner.*

J. ADEE, *Assistant Examiner.*